United States Patent [19]

Butterfield et al.

[11] Patent Number: 5,026,462
[45] Date of Patent: Jun. 25, 1991

[54] METHOD AND APPARATUS FOR ELECTROCHEMICAL MACHINING OF SPRAY HOLES IN FUEL INJECTION NOZZLES

[75] Inventors: Donald B. Butterfield, Longmeadow, Mass.; Alcide Sgarzi, Brescia, Italy

[73] Assignee: AIL Corporation, Columbia, S.C.

[21] Appl. No.: 489,371

[22] Filed: Mar. 6, 1990

[51] Int. Cl.⁵ .................... B23H 3/08; B23H 3/10; B23H 9/14; B23H 9/02
[52] U.S. Cl. .................... 204/129.55; 204/129.7; 204/129.75; 204/224 M
[58] Field of Search ............ 204/129.55, 129.75, 204/224 M, 129.7

[56] References Cited

U.S. PATENT DOCUMENTS

| | | | |
|---|---|---|---|
| 3,551,310 | 12/1970 | Inoue | 204/224 M X |
| 3,788,964 | 1/1974 | Kurz et al. | 204/224 M |
| 4,482,445 | 11/1984 | Fjelstad | 204/224 M X |
| 4,522,692 | 6/1985 | Joslin | 204/129.7 X |
| 4,578,164 | 3/1986 | Matsui et al. | 204/129.55 |
| 4,601,803 | 7/1986 | Gregory | 204/224 M |

*Primary Examiner*—Donald R. Valentine
*Attorney, Agent, or Firm*—Richard D. Weber; Albert L. Free

[57] ABSTRACT

The inner end of a spray hole in a fuel injection nozzle for an internal injection engine is electrochemically machined by providing a negative electrode inside a chamber in said body, while applying an electrolyte under pressure to the exterior of the nozzle body, so as to cause the electrolyte to flow through the spray hole inwardly of said body. The electrolyte is preferably an aqueous solution of NaCl.

14 Claims, 3 Drawing Sheets

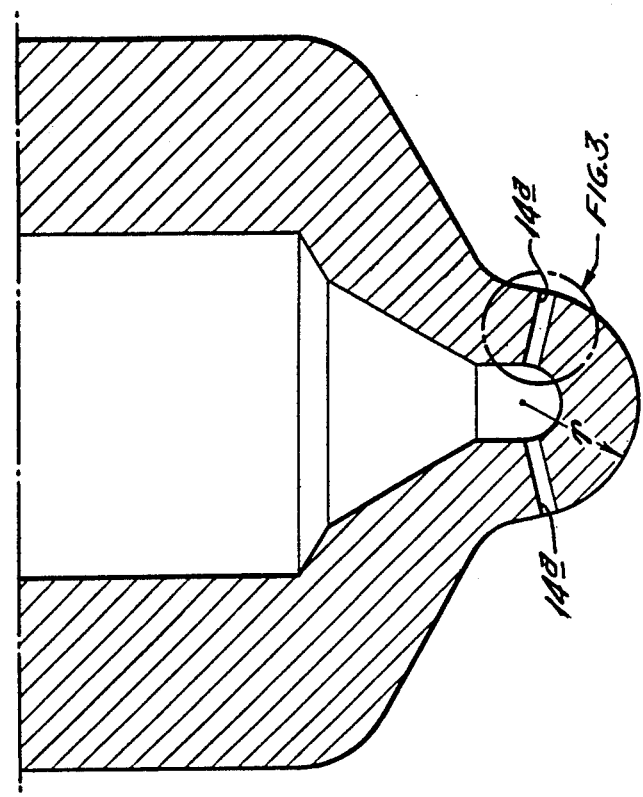
Fig. 1. (Prior Art)
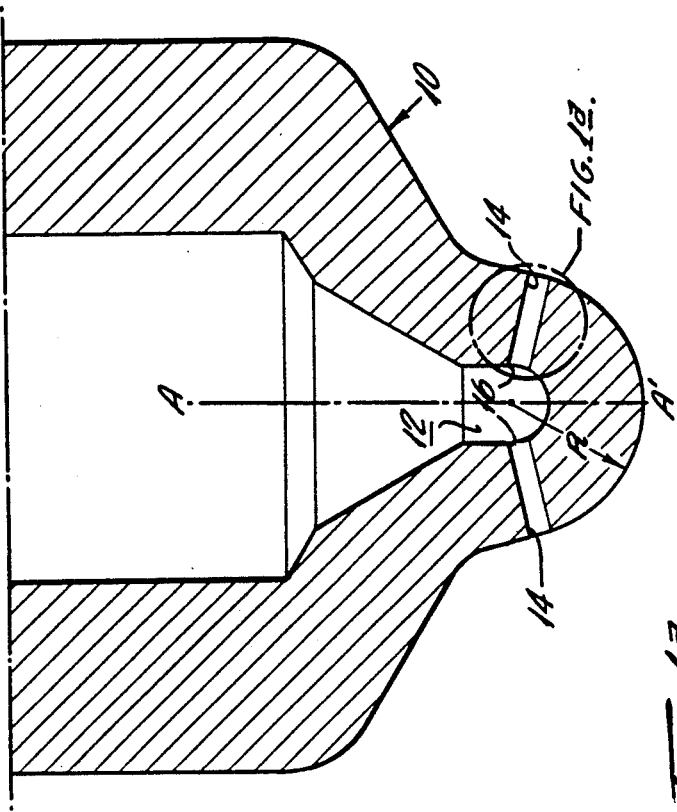
Fig. 1a. (Prior Art)
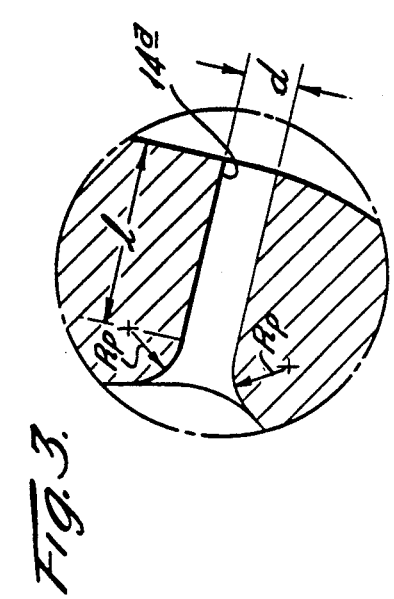
Fig. 2.
Fig. 3.

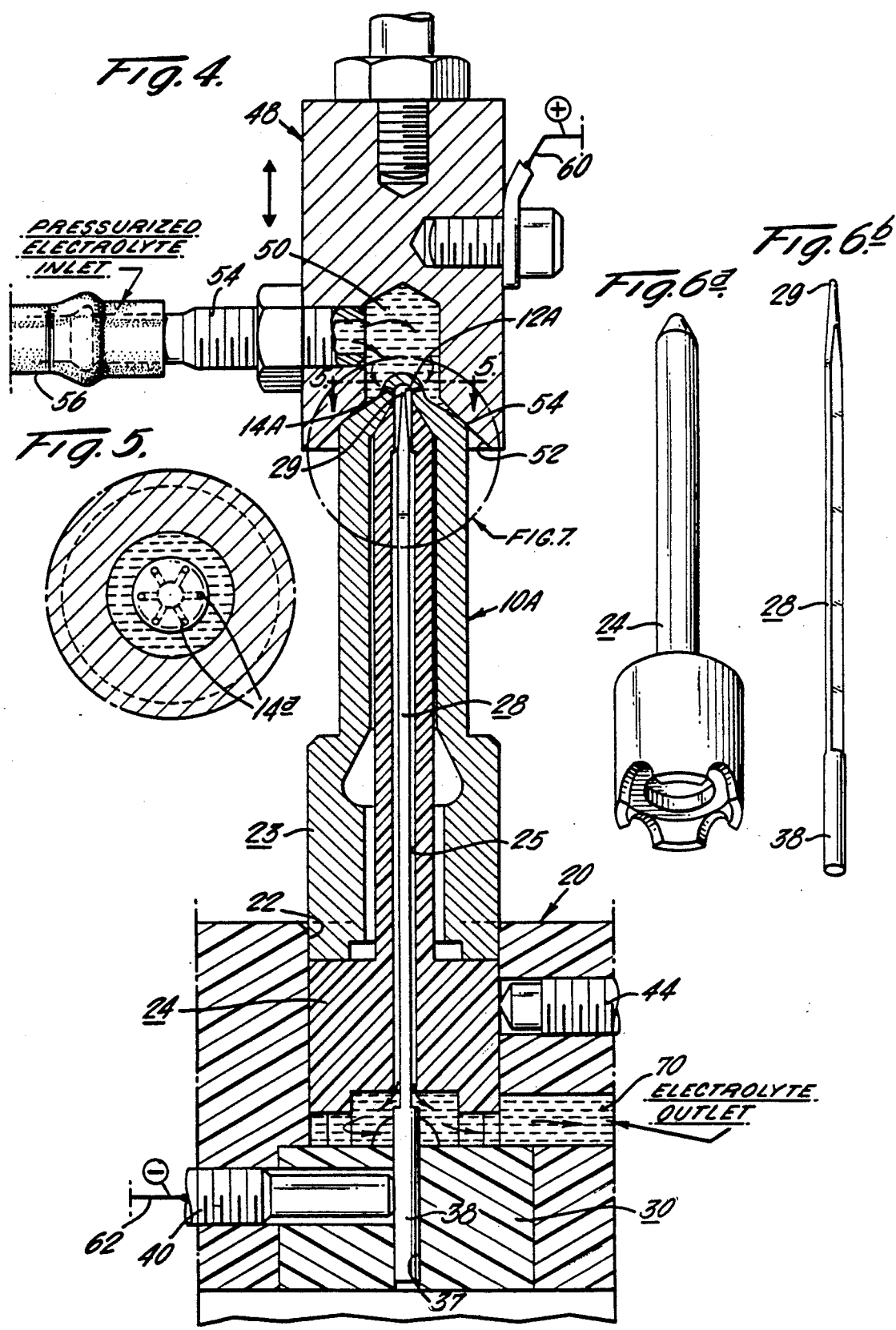

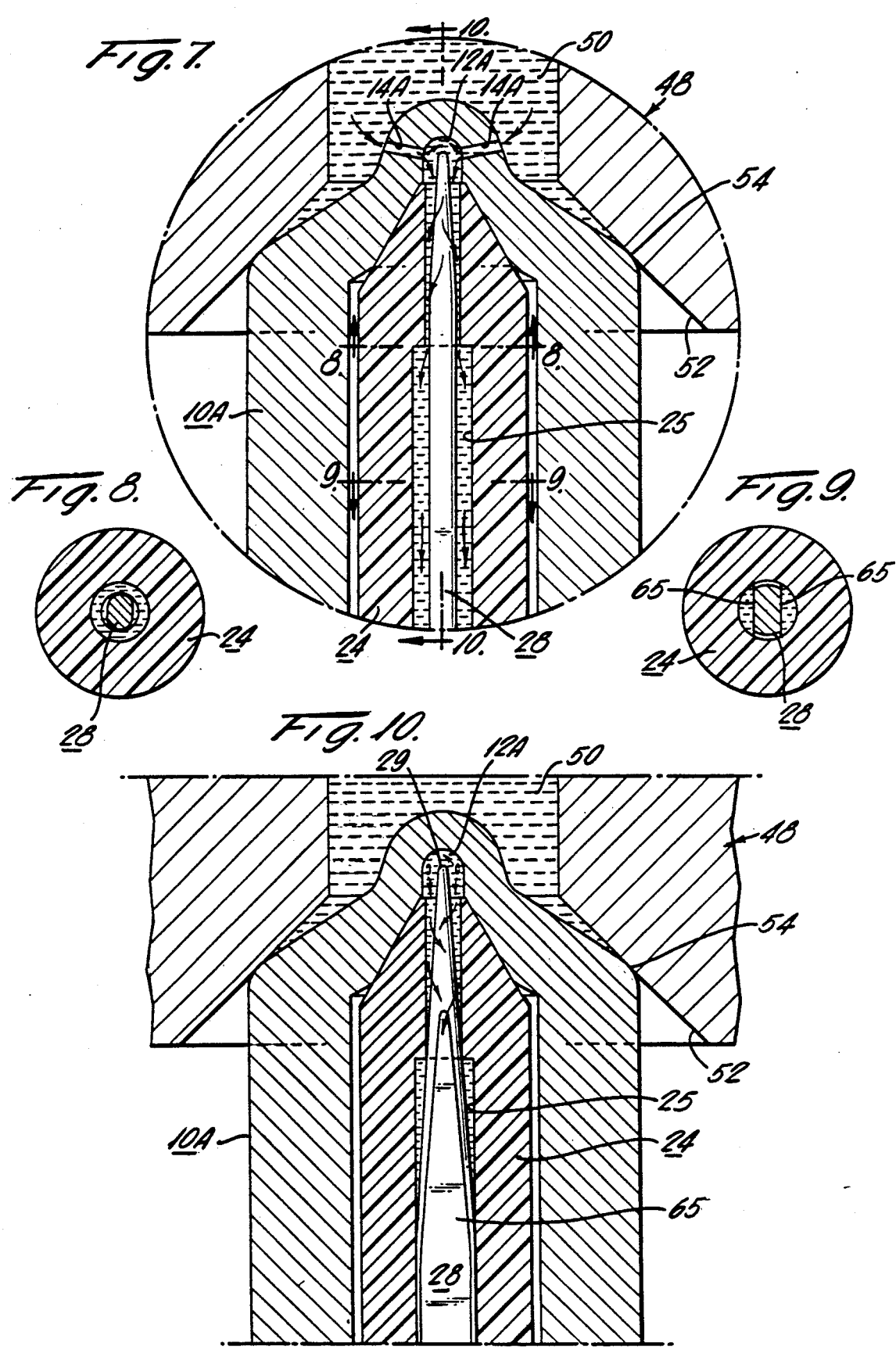

METHOD AND APPARATUS FOR ELECTROCHEMICAL MACHINING OF SPRAY HOLES IN FUEL INJECTION NOZZLES

FIELD OF THE INVENTION

This invention relates to method and apparatus for the electrochemical machining of the body of a spray nozzle for fuel injection into an internal combustion engine, so as to improve the configuration of the spray holes previously formed therein by conventional machining.

BACKGROUND OF THE INVENTION

A fuel injection nozzle for an internal combustion engine, such as a diesel engine, typically employs a nozzle body to the interior of which the fuel under pressure is applied, the nozzle being provided with spray holes extending through its side walls near its tip through which the pressurized fuel is sprayed outwardly into the engine cylinder for combustion therein. Typically, more than one spray hole is used per nozzle; in some cases the spray holes extend nearly radially of the nozzle axis and other times they may be somewhat more tilted with respect thereto.

The usual method for initial forming of the spray holes is to bore or drill the holes from the exterior of the nozzle, resulting in cylindrical spray hole which form sharp edges and corners with the interior of the nozzle body wall. It has been found desirable to provide local electrochemical machining at the inner ends of the holes, to round, or increase the radius of the curvature, of the inner edges of the bore holes. This provides a smooth enlarged mouth at the inner end of the bore holes, facilitating smooth, efficient flow of fuel into the spray holes during subsequent use.

It was previously found that, when no such rounding of the edge was provided, over long periods of use the original sharp edges became somewhat rounded due to wear. The result was that the amount of fuel injected changed, after long use, from that for which the nozzle was originally designed, generally increasing appreciably. Such gradual departure of the nozzle characteristics from their original design parameters was found undesirable, not only because of the increase of fuel flow and resultant engine power rise, but also because of increases in smoke levels and other related emissions. While attempts have been made to avoid such wear by techniques such as use of hard nozzle materials, hardening of the nozzle material adjacent the inner ends of the spray holes, and use of various coatings and platings to resist such wear, these efforts have proved to be less effective than desired, and/or difficult to provide.

U.S. Pat. No. 4,578,164 of Yukio Matsui and Mitsuo Uchiyama, issued Mar. 25, 1986, refers to a method of finishing spray holes, previous formed by drilling through the wall of a fuel injection nozzle by removing burrs that remain around the inside mouth of each spray hole. The patentees disclose for this purpose an electrolytic polishing process wherein the nozzle body is made positive with respect to an electrode in the electrolyte. A tubular electrode having an insulating cover is inserted into the nozzle body, and electrolyte liquid is supplied under pressure to the interior of the tubular electrode so as to flow outwardly through the spray holes. In this process, the diameter of each spray hole is said to be enlarged contiguous to the inside mouth thereof, and in the case of the sac-less nozzle described in the patent, the enlargement of the mouth section of each spray hole is described as increasing the flow coefficient of the injection nozzle, with resultant favorable effects on the performance of the sac-less fuel injection nozzle. The preferred electrolyte mentioned in the patent is an aqueous solution of sodium chloride. Such enlargement of the mouth of each spray hole is also described as enabling the shortening of the injection duration, which tends to maintain the desired output performance of the engine at high speeds and improves the fuel economy as well as the atomization of the sprayed fuel in low speed ranges of the engine. However, we have found that the type of electromachining described in the Matsoi et al patent tends undesirably to enlarge not only the inner ends of the spray holes but also more interior portions thereof, changing the inner diameter from that originally machined therein.

It is an object of the present invention to provide a method and apparatus for providing improved electrochemical machining of the interior ends of spray holes extending through the wall of the body of a spray nozzle for an internal combustion engine.

Another object is to provide such electrochemical machining which is especially effective in providing a desired smooth, rounded inner edge of a spray hole edge, without thereby substantially increasing the diameter of the remaining portion of the spray hole.

SUMMARY OF THE INVENTION

These and other objects and features are obtained by the provision of method and apparatus in which a cathode rod is located with its tip extending into the spray nozzle adjacent the inner ends of the spray holes and maintained negative with respect to the nozzle, while a flow of an electrolyte is provided inwardly of the holes. Preferably the electrolyte concentration and the electrolytic current are maintained at low values during the process, and an insulating member is positioned between the inner bore of the nozzle body and the electrode so that only the region in the vicinity of the inner ends of the spray holes is subjected to the electrolyte flow, the electrolyte then flowing downwardly through the region between the electrode and the inner surface of the insulator to a bottom outlet.

Preferably the electrode has a diameter of no more than about 0.020 inch at its tip, and the electric current is preferably no more than about 5 amperes. The electrolyte preferably comprises an aqueous solution of sodium chloride, with a concentration of no more than about 73 grams per liter.

Using this method and apparatus, smooth, controlled, rounding of the inner edge of the spray holes is achieved, without substantially increasing the diameters of the other portions of the spray holes.

BRIEF DESCRIPTION OF FIGURES

Other objects and features of the invention will be more readily understood from a consideration of the following detailed description, taken together with the accompanying drawings, in which:

FIG. 1 is a fragmentary sectional view of a prior-art fuel-injection nozzle with spray holes drilled therein, prior to any electrochemical machining;

FIG. 1a is an enlarged fragmentary sectional view of the portion of the nozzle of FIG. 1 within the broken-line circle marked "1a", showing in broken line the spray hole configuration after conventional electromachining;

FIG. 2 is a fragmentary sectional view of a fuel-injection nozzle prior to its electromachining in accordance with this invention;

FIG. 3 is an enlarged fragmentary sectional view of the portions of the nozzle of FIG. 2 enclosed by the broken circle marked "FIG. 3", after the nozzle has been subjected to electromachining according to the present invention;

FIG. 4 is a vertical sectional view of the apparatus according to the invention;

FIG. 5 is a cross-sectional view taken on lines 5—5 of FIG. 4;

FIG. 6a is a perspective view of the insulating member used in the apparatus of FIG. 4;

FIG. 6b is a perspective view of the cathode electrode used in the apparatus of claim 4;

FIG. 7 is an enlarged fragmentary vertical sectional view of the portion of the apparatus encircled in FIG. 4;

FIG. 8 is a sectional view taken along lines 8—8 of FIG. 7;

FIG. 9 is a sectional view taken along lines 9—9 of FIG. 7; and

FIG. 10 is an enlarged fragmentary vertical sectional view taken along lines 10—10 of FIG. 7.

DETAILED DESCRIPTION OF SPECIFIC EMBODIMENTS

Considering now the specific embodiment of the invention shown on the drawings by way of example only, and without thereby in any way limiting the scope of the invention, FIG. 1 shows a cross-section of one known type of diesel spray nozzle body 10, including a sac 12 with spray holes such as 14 extending through its walls; typically there will be six such generally cylindrical spray holes positioned equiangularly about the longitudinal axis A—A1 of the nozzle body. In use, fuel supplied to the cavity in the nozzle body is forced outwardly through the spray holes, by applied pressure, to introduce an atomized spray of fuel onto the adjacent engine cylinder, into which the tip of the nozzle body extends.

As shown particularly clearly in FIG. 1, the inner ends such as 16 of the spray holes 14, when first drilled, form sharp, small-radius corners or edges with the interior surface of the nozzle body. As described hereinabove, it has been found highly desirable, from the viewpoints of efficiency of fuel flow and maintenance of the initial spray-hole geometry over long periods of use, to provide a substantial rounding off of such edges, making them more smooth and gradual, with a larger radius of curvature.

FIG. 1a shows enlarged a typical spray hole of the nozzle of FIG. 1 after it has been treated by known electrochemical machining to enlarge and round-off the inner end thereof. The broken lines in FIG. 1a show the original diameter of the spray hole; while exaggerated in the drawing for clarity, it will be seen that the electrochemical machining has increased the diameter of the spray hole along its length, remote from its inner end, although not necessarily uniformly throughout. The final spray hole thus has a diameter dependent on the unavoidably variable parameters of the electromachining process, rather than being accurately determined by the original drilling.

FIGS. 2 and 3 show a typical spray nozzle body made by the method of the invention; in FIG. 2 the spray holes are shown as when freshly drilled, while in FIG. 3 the inner ends of the spray holes 14A have been rounded to present a relatively large radius of curvature $R_p$. With this arrangement, the diameters and lengths of the spray holes can also be made smaller, with advantageous results; thus typically, and advantageously, the radius r of the outside of the sac of body 10 may be smaller than that of the prior-art nozzle shown in FIG. 1, the length 1 may be less than the length L of the prior art arrangement of FIG. 1A, and the diameters of the spray holes d less than the diameter D of the spray hole in FIG. 1A.

More particularly, in accordance with the preferred embodiment of the present invention, the spray holes are first formed by inward drilling using a drill diameter selected to provide exactly the spray hole diameter desired; the inner ends of the spray holes are then electrochemically machined to round off the inner corners, in a manner which does not substantially affect the diameters of the remaining portions of the spray holes. Thus in FIG. 3 the diameter d of the spray hole which is essentially unchanged during electromachining. Accordingly, the final diameters and lengths of the spray holes can be determined accurately by the original drilling or boring process, with electrochemical machining merely providing a highly desirable rounding of the inner edges of the spray holes.

Referring now to FIGS. 4–10 showing preferred apparatus for performing the method of the invention, in this case it is assumed that there are six equiangularly-spaced spray holes 14A as shown in FIG. 5, extending through the side walls of the sac portion 12A of the spray nozzle. A nozzle and electrode mounting fixture 20 is provided, in which the nozzle body is mounted in a vertically upright position, as shown. To effect such mounting, a circular well 22 is provided at the center of the top surface of fixture 20, into which the exterior periphery of the enlarged cylindrical end 23 of the nozzle body fits snugly, to hold it erect. Prior to placing the nozzle body into the position shown, the electrically insulating member 24 is positioned in the same well 22, seating itself against a block insert 30 mounted in the lower side of the fixture 20. Insulating member 24 has a central bore 25 accommodating an electrode rod 28 which also extends vertically, with its upper tip end 29 positioned centrally between and adjacent the inner ends of the spray holes 12A. To accomplish this, a bore 37 is provided in the insert 30, which snugly receives the lower, enlarged cylindrical end portion 38 of the electrode rod 28, the precise vertical position of the rod being adjustable by sliding it vertically and securing it in its final position by means of the set screw 40 in fixture 20.

To assemble the arrangement, the electrode rod 28 is first slid into position and secured by set-screw 40; then the insulator member 24 is slid over the electrode rod and into position in the fixture 30;, and finally, the nozzle body 10A is positioned in the fixture as shown. Exact and fine adjustment of the vertical positions of the nozzle body and the insulator member can be accomplished by sliding both in the well 22 arfd, when finally positioned, tightening the set screw 44.

With the above described members in place, a chamber block 48 is sealingly placed over the upper end of the exterior of the nozzle body, so that the chamber 50 contained therein encompasses the spray holes 14A. To seal the chamber block to the upper end of the nozzle body, a bevelled surface 52 formed on the lower end of the block is pressed against the peripheral edge 54 of the nozzle body, by means of a hydraulic piston 60 actuated by an appropriate hydraulic cylinder (not shown).

Pressurized electrolyte is supplied to the chamber 50 by way of inlet tube 54, the exterior end of which may communicate with an electrolyte-supplying hose 56, and the inner end of which communicates with the chamber 50.

With the parts in position as shown in FIG. 4, an electric biasing source (not shown) maintains wire 60 positive with respect to wire 62; since chamber block 48, nozzle body 10A, set screw 40 and rod 28 to which the wires are connected are all electrically conductive, this serves to maintain electrode rod 28 negative with respect to the nozzle body. While this potential is being applied, and while the hydraulic piston maintains the seal of the chamber to the upper end of the nozzle holder, the pressurized electrolyte flows from chamber 48 inwardly through the spray holes and into the opening provided between the outer diameter of electrode rod 28 and the inner surface of insulating member 24. As shown in FIG. 6b, 8 and 9, preferably the interior surface of the insulating element 24 is cylindrical and the central portion of the electrode rod 28 is flat, with a width which fits snugly into the cylindrical insulating element, as shown in FIG. 8, to position the electrode accurately therein; the flat surfaces 65 of the electrode rod provide a path for the electrolyte to flow downwardly, from the inner ends of the spray holes through the space between electrode rod and insulating member, into an electrolyte outlet 70, for collection and recirculation.

It will be understood from the foregoing that the nozzle body is provided with the drilled spray holes 14A prior to its assembly in the fixture 20 shown in FIG. 4. The negative bias is then applied to the electrode 28 while the electrolyte flows inwardly through the spray holes and the sealing pressure is applied to the chamberblock 48, to produce electromachining of the inner ends of the spray holes, and is continued until the inner ends of the spray holes have been electrically machined to exhibit smooth, rounded corners of relatively larger radius of curvature than before the process began. When the desired degree of rounding has been obtained, the bias and electrolyte supply are shut off, the piston actuator raises the chamberblock 48, and the finished nozzle removed from the fixture.

In the preferred embodiment, the electrolyte is an aqueous solution of NaCl of relatively weak concentration, typically no more than about 73 grams of NaCl per liter of water. The diameter of electrode tip 29 is also preferably small, not only to fit within the sac but also to maintain a reasonable spacing between the electrode and the inner ends of the adjacent spray holes; an electrode diameter of no greater than about 0.020 inch is preferred. The electric current flowing in response to the biasing potential is preferably maintained relatively low, to provide the desired smooth machining, without causing substantial removal of material from portions of the spray hole remote from the inner ends, a typical value being no more than about 5 amperes for the arrangement shown. The rod electrode 28 may protrude about 1.1 inch above the end of the adjacent and surrounding insulating element, and a typical electrolyte pressure is about 2 atmospheres. A biasing potential of about 15 volts is typical for this example.

It has been found that when a process such as that described in the referenced patent is conducted with the electrolyte flowing outward through the nozzle holes, the interior portions of the spray holes are substantially machined away by electrochemical action, so as to change their diameters from those originally established by the initial drilling or boring procedure. Since it is highly advantageous to provide and maintain exactly a predetermined diameter for the spray holes, using such a prior-art an arrangement of electrolyte outflow requires extremely accurate and critical control of the electrochemical machining conditions. With the arrangement of the invention, however, in which the electrolyte flow is inwardly through the spray holes, it has found that the electrochemical action is confined substantially entirely to the region adjacent the inner ends of the spray holes, and therefore the critical initial machine diameters are maintained throughout the process. In this way, the originally-designed values of spray hole diameters are provided and will persist throughout long periods of usage, without requiring critical control of the parameters of the electromachining process are not highly critical.

There has therefore been provided a method and apparatus for electrochemically machining the inner end of a spray hole in a nozzle body for an internal combustion engine, which is effective to produce desired rounding of the corner formed by the inner end of the spray hole, but which does not materially affect the interior diameter of the spray hole, with consequent practical advantages as described above.

While the invention has been described with particular reference to specific embodiments thereof in the interest of complete definiteness, it will be understood that it may be embodied in a variety of forms differing from those specifically shown and described, without departing from the spirit and scope of the invention.

What is claimed is:

1. The method of electrochemically machining material at the inner end of least one spray hole formed in the body of a fuel injection nozzle for an internal combustion engine, comprising:
   providing an electrode within, and electrically insulated from, said body; and
   maintaining said electrode at a negative electrical potential with respect to said body while applying a pressurized electrolyte to the exterior of said nozzle body so as to pass said electrolyte through said at least one spray hole inwardly of said body, thereby to electrochemically machine away portions of said body adjacent to the inner end of each said spray hole.

2. The method of claim 1, wherein said nozzle body contains a sac portion, and there are a plurality of said spray holes each extending through the wall of said sac portion.

3. The method of claim 1, wherein the inner end of each of said spray hole is of small radius of curvature when said machining is initiated, and said method is continued until said inner end is of substantially greater radius of curvature than prior to said machining.

4. The method of claim 1, wherein said electrolyte is a water solution of a salt.

5. The method of claim 4, wherein said body is a ferrous metal and said electrolyte is a weak solution of NaCl in water.

6. The method of claim 1, wherein the current flow in said electrolyte due to said potential is no greater than about 5 amperes.

7. The method of claim 1, wherein said electrode is no greater than about 0.020 inch in diameter at the end thereof within said nozzle.

8. The method of electrochemically machining material at the inner ends of a plurality of spray holes formed in the body of a ferrous-metal injection nozzle for an internal combustion engine, the inner ends of such spray holes before said machining defining small-radius corners in said body, said method comprising:

provided an upright electrode the upper end of which extends within said body and is no greater than about 0.020 inch in diameter, said electrode being electrically insulated from said body;

applying to the exterior of the portion of said body containing said spray holes an electrolyte under pressure to produce a flow of said electrolyte through said spray holes inwardly of said body: and while said inward flow is occurring, maintaining said electrode at a negative potential with respect to said body, thereby to electrochemically machine the material of said body at said inner ends of said spray holes and to increase the radii curvature of said corners, the current flowing through said electrolyte due to said potential being no greater than about 5 amperes.

9. The method of claim 8, wherein said applying of said pressurized electrolyte comprises providing a chamber which encompasses the outer ends of said holes and is sealed to the exterior of said body, and supplying said electrolyte under pressure to the interior of said chamber.

10. The method of claim 9, wherein said electrode is in the form of an elongated rod, the upper end portion of which is positioned adjacent the inner ends of said spray holes, all but said upper end portion of said rod being encompassed by insulating material.

11. Apparatus for treating the body of a fuel injection nozzle for an internal combustion engine, said body having at least one spray hole extending through it, said apparatus comprising:

an upright elongated electrode, and means for positioning the upper end portion of said electrode within said body adjacent to said spray holes;

means for biasing said electrode negative with respect to said body; and means for flowing an electrolyte inwardly through said spray holes, into the interior of said body and past said upper end portion of said electrode, while said electrode is biased negatively, to produce electrochemical machining of the portions of said body adjacent the inner ends of each of said at least one spray holes.

12. The apparatus of claim 11, comprising an insulating sleeve surrounding said electrode below said upper end portion thereof and sealed against the interior of said body at least near its upper end, to prevent substantial downward flow of electrolyte along the interior surface of said body;

said insulating sleeve and said electrode providing between them a path for said electrolyte to drain downwardly from said body.

13. The apparatus of claim 11, wherein said means for flowing said electrolyte inwardly through said spray holes comprises a chamber encompassing the exterior openings of said spray holes and sealed to the exterior of said body, and means for delivering said electrolyte to said chamber under pressure.

14. The apparatus of claim 13, wherein said electrolyte is a weak saline solution, said upper end portion of said electrode is no more than about 0.020 inch in diameter, and the current flowing in said electrolyte due to said negative biasing is no more than about 5 amperes.

* * * * *